United States Patent [19]

Dostoomian

[11] Patent Number: 4,737,038
[45] Date of Patent: Apr. 12, 1988

[54] IMMERSION INFRARED THERMOMETER FOR MOLTEN MATERIALS

[75] Inventor: Ashood S. Dostoomian, Stoughton, Mass.

[73] Assignee: Vanzetti Systems, Stoughton, Mass.

[21] Appl. No.: 3,438

[22] Filed: Jan. 15, 1987

[51] Int. Cl.$^4$ .................... G01K 1/12; G01J 5/10
[52] U.S. Cl. .................... 374/139; 250/577; 374/131; 374/164
[58] Field of Search .......... 374/131, 139, 164; 250/577; 33/126.7 R

[56] References Cited

U.S. PATENT DOCUMENTS

| | | | |
|---|---|---|---|
| 3,610,045 | 10/1971 | Shearman | 374/139 |
| 3,626,758 | 12/1971 | Stewart et al. | 374/129 |
| 3,745,834 | 7/1973 | Veltze et al. | 374/139 |
| 3,946,610 | 3/1976 | Sartorius | 374/139 X |
| 4,158,965 | 6/1979 | Prosky | 374/164 |
| 4,448,661 | 5/1984 | Roggen | 374/131 X |
| 4,508,461 | 4/1985 | Lambert | 374/164 |
| 4,619,533 | 10/1986 | Lucas et al. | 374/131 X |
| 4,647,222 | 3/1987 | Schultheiss | 374/139 |

Primary Examiner—Daniel M. Yasich
Attorney, Agent, or Firm—Sughrue, Mion, Zinn, Macpeak, and Seas

[57] ABSTRACT

A hollow dipstick is provided for immersion in molten material to determine the temperature of the molten material at any desired depth. The hollow dipstick is connected to an infrared detector by means of an optical fiber bundle for producing a signal indicative of the temperature of the molten material. An infrared focusing lens is provided within the hollow dipstick for transmitting the infrared radiation from the interior bottom surface of the dipstick to the fiber optic bundle. A container having a heating element therein is provided for receiving the dipstick when it is not in use so as to preheat the dipstick to a temperature close to the estimated temperature of the molten material to be measured to thereby prevent thermal shock to the dipstick upon immersion in the molten material. Alternatively the infrared detector is mounted directly on the dipstick.

7 Claims, 2 Drawing Sheets

IMMERSION INFRARED THERMOMETER FOR MOLTEN MATERIALS

BACKGROUND OF THE INVENTION

The present invention is directed to an immersion infrared thermometer for molten materials, such as steel, aluminum, salts and the like, and more specifically to a hollow tube having a closed end with infrared radiation detection means focused on the interior surface of the closed end and means for preheating the tube to prevent thermal shock on immersion of the tube into a molten material.

The present practice for determining the temperature of molten materials involves the use of electrical thermocouples which are adapted to be immersed in the molten material. However such electrical thermocouples will melt upon immersion in the molten material thereby wasting a thermocouple every time a temperature measurement is taken. Furthermore, due to the melting of the electrical thermocouple upon insertion into the molten material it is practically impossible to determine the exact depth at which the temperature is being measured.

SUMMARY OF THE INVENTION

The present invention provides a new and improved thermometer for molten materials which utilizes a hollow dipstick made of a material which at the maximum temperature possibly expected for the particular molten material will not soften nor contaminate the material. The bottom end of the dipstick is hermetically sealed while the top end is coupled to a lens casing having a lens which is focused on the center of the interior bottom surface of the hollow dipstick. An infrared detector calibrated to provide an output indicative of the temperature at the bottom of the dipstick may be mounted directly on the lens casing in optical alignment with the lens or at a remote location, in which case it is optically coupled to the lens by means of a flexible optical fiber assembly.

In order to prevent cracking of the dipstick due to thermal shock to which it is subjected at the time of immersion in the molten material, a preheating device is provided for the hollow dipstick which will elevate the dipstick to a sufficiently high temperature to avoid any possibility of damage by thermal shock. The temperature of the molten material in a crucible can be determined at various depths by controlling the depth of penetration of the dipstick into the molten material.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1A:
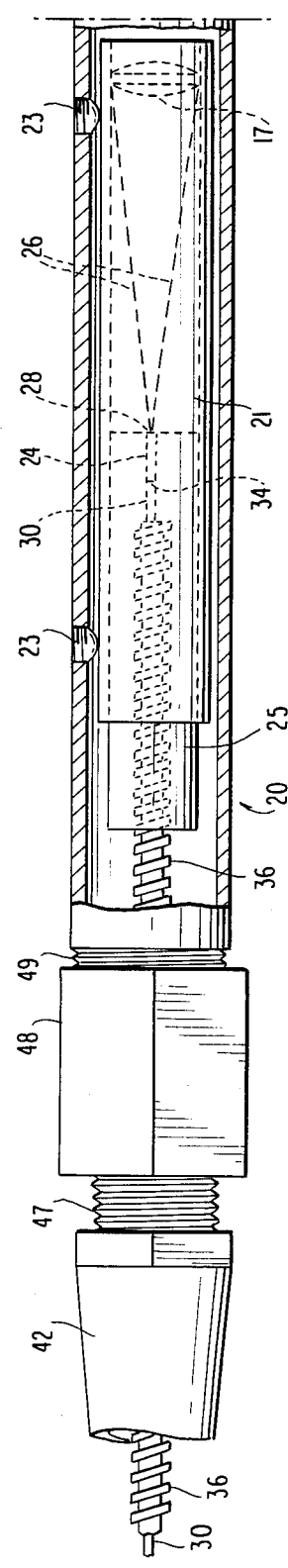
FIGS. 1a and 1b are side elevation broken views, partly in section, of a first embodiment of an immersion infrared thermometer according to the present invention wherein the right end of the device in FIG. 1a mates with the left end of the device in FIG. 1b.
Figure 1B:
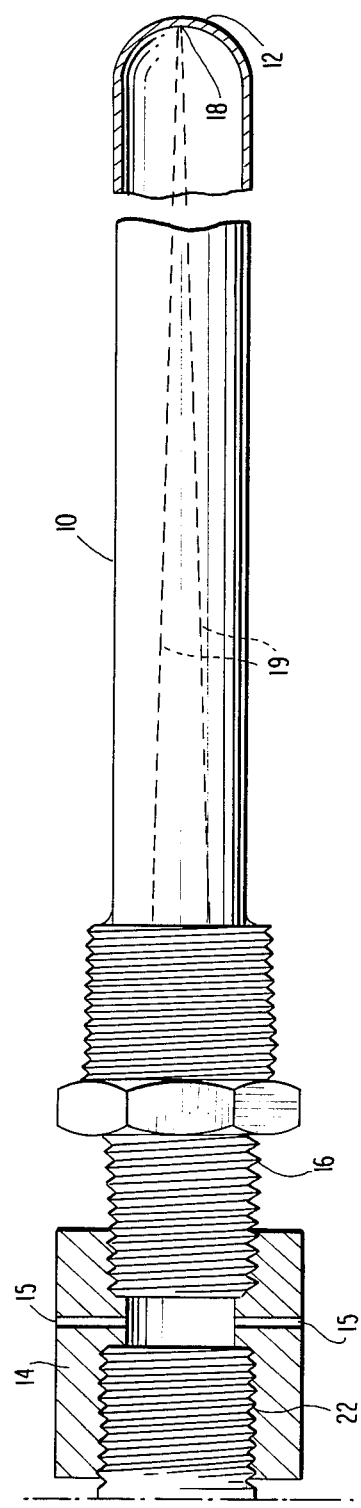

The immersion infrared thermometer according to a first embodiment of the present invention as shown in FIGS. 1a, 1b, 2 and 3 is comprised of a hollow dipstick 10 which is made of material which, at the maximum temperature possibly expected for the molten material such as metal or salts to be measured, will not soften, melt, or contaminate the material. Thus, for molten materials such as steel which have a temperature range from 1200° C. to 1500° C. a ceramic material adapted to maintain its integrity at these temperatures would be suitable. For molten aluminum having a temperature range from 500° C. to 1000° C., a steel or ceramic material for the hollow dipstick would be acceptable. The hollow dipstick is provided with a closed end 12 which may be of integral one piece construction with the hollow tube or which may be formed separately and hermetically sealed to the hollow dipstick by any suitable means.

An annular coupling ring 14 of steel or the like which is not intended to be immersed in the molten material is secured to the upper end of the hollow dipstick 10 by means of a thread connection 16 or any other suitable connection. The central non-threaded portion of the coupling ring 14 is provided with a plurality of radially directed air exhaust ports 15. The opposite end of the ring 14 is secured to an enclosure member 20 by means of a threaded connection 22 or any other suitable connection.

A lens casing 21 having a double convex lens 17 secured at one end thereof is adjustably mounted in the enclosure member 20 by means of one or more set screws 23 as shown in FIG. 1a. Thus the focal point of the lens 17 on the side thereof facing the dipstick 10 can be located exactly on the inside surface 18 of the end portion 12 of the dipstick 10 as shown by the dashed lines 19. An optical transmission rod 24 of sapphire or quartz is secured at one end of a cylindrical end fitting 25 which is slidably mounted within the lens casing 21 in order to position the end surface 28 of the rod 24 at the opposite focal point of the lens 17 as shown by the dashed lines 26. The end fitting 25 may be secured within the lens casing 21 in the adjusted position by any suitable means such as set screws or the like (not shown).

A fiber optic bundle 30 having a suitable covering 36 is secured in the opposite end of the end fitting with the end of the fiber optic bundle 30 disposed in abutting or closely spaced alignment with the end 34 of the rod 24. Thus the infrared radiation from the internal bottom end of the dipstick 10 can be transmitted through the lens 17 and the transmission rod 24 to the fiber optic bundle 30 for further transmission to a remote infrared radiation detector capable of converting the infrared radiation to an electrical signal indicative of the temperature of the molten material surrounding the end 12 of the dipstick 10. The end fitting 25 may be of any suitable material which is resistant to high temperatures so that the end fitting 25 and the optical transmission rod 24 will isolate and protect the end of the fiber optic bundle 30 from the intense heat radiating from the dipstick 10.

Figure 3:
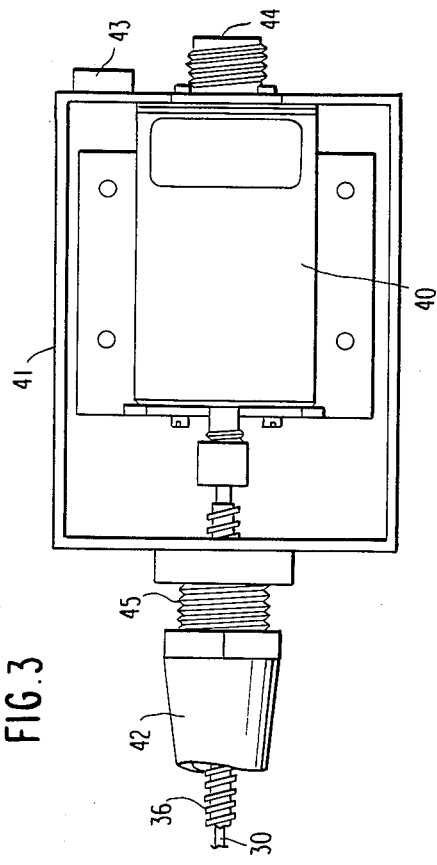
FIG. 3 is a side elevation view of an infrared detector assembly with the cover removed for use with the thermometer shown in FIGS. 1a and 1b.

The opposite end of the fiber bundle 30 is connected to an infrared detector 40, as shown in FIG. 3, which is mounted within a housing 41. An air inlet port 43 is provided at one end of the housing 41 which is adapted to be connected to a source of cooling air (not shown). A fitting 44 is secured to the infrared detector 40 for connecting the infrared connector 40 to a conventional temperature readout means. The entire length of the covered fiber optic bundle 30 from the housing 41 to the enclosure member 20 is covered by a hollow tubular casing 42 which is secured at one end to the housing 41 by means of a threaded coupling 45 and which is secured at the opposite end to the threaded end portion 47 of a coupling member 48 which in turn is connected to the threaded end portion 49 of the enclosure member 20. Thus the cooling air entering through the port 43 passes through the housing 41, the hollow tubular casing 42, the coupling member 48, the enclosure member 20 and the coupling ring 14 to the air outlet ports 15. Thus the entire length of the fiber optic bundle is protected from high temperatures which would adversely affect the fiber optic bundle.

Figure 2:
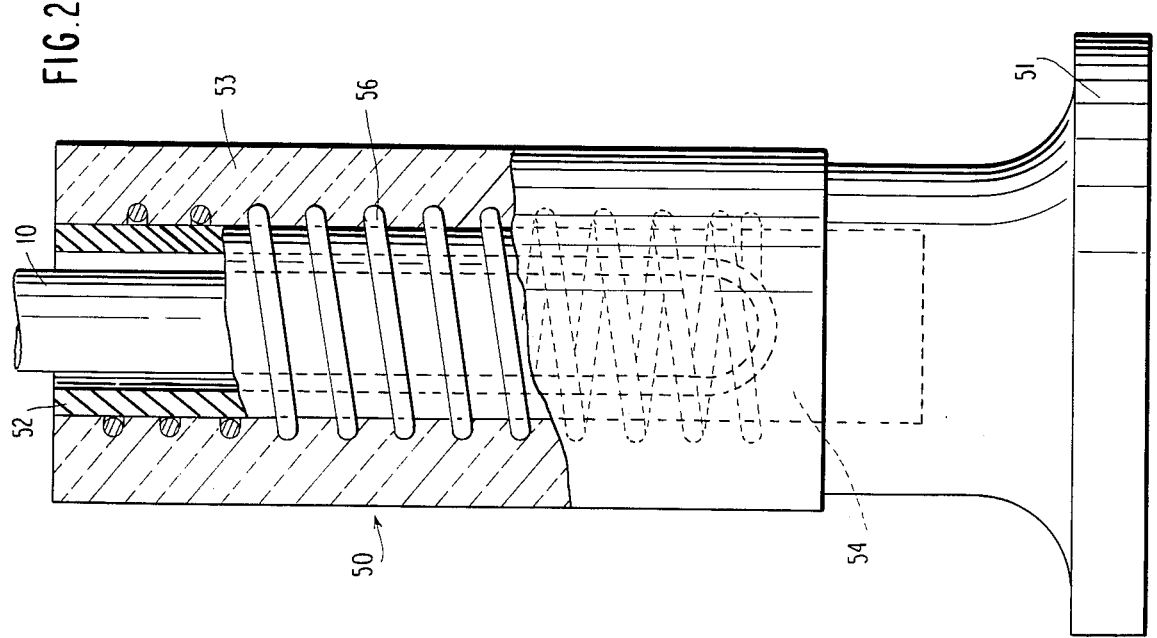
FIG. 2 is a side elevation view, partly in section and partly broken away, of a preheating receptacle for the thermometer.

In order to prevent deformation or cracking of the dipstick 10 due to the thermal shock to which it is subjected at the time of immersion in the molten metal a preheating device 50, as shown in FIG. 2, is provided for the dipstick. The preheating device 50 is comprised of a hollow tubular housing 52 of insulating material or the like having a closed end 54. An induction heating coil 56 surrounds the hollow tubular housing 52 and in turn is covered by a layer of insulating material 53. The hollow tubular housing 52 is dimensioned so as to closely receive the dipstick 10 along substantiallly its entire length. The end of the dipstick 10 may rest on the bottom of the hollow tubular housing 52 or the dipstick 10 may be suspended within the housing in spaced relation to the housing as shown in FIG. 2 by any suitable means. For example, the threaded coupling member 16 may rest on the upper surface of the housing 52 or the threaded coupling member 16 may be secured to a separate bracket (not shown). Upon energization of the induction heating coil 56 the hollow tubular dipstick 10 will be heated and automatically held at a steady temperature just below the estimated melting temperature in the crucible. Since the infrared detector constantly measures the temperature at the bottom end of the dipstick, a conventional feedback loop can be provided for controlling the degree of heating required to keep the dipstick at the desired temperature so that it is always ready for immediate use. Preheating of the dipstick can also be done with a gas flame, an electrical resistance heater or any other suitable heating device. Since thermal shock is avoided it is possible to achieve a long life for the dipstick which is limited only by accidental damage from mishandling.

Figure 4:
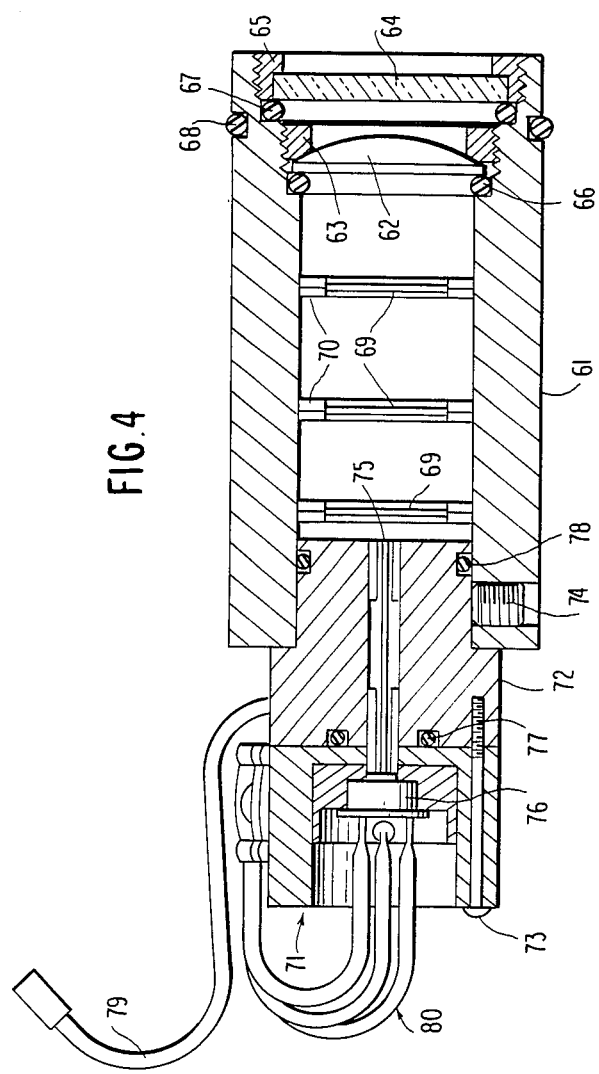
FIG. 4 is a side elevation view, partly in section, of a second embodiment of a lens and infrared detector assembly according to the present invention.

In a second embodiment of the invention as shown in FIG. 4 the infrared detector assembly is integrally mounted on the lens causing thereby eliminating the need for the fiber optic bundle 30 and the attendant cooling system. The entire assembly as shown in FIG. 4 is adapted to be mounted in a hollow cylindrical enclosure member similar to the housing 20 shown in FIG. 1a which is secured to the end of the dipstick 10. The assembly shown in FIG. 4 would be mounted within the enclosure member 20 in the same manner in which the lens casing 21 is mounted within the enclosure member 20 by means of set screws or the like. The assembly is comprised of a hollow cylindrical lens casing 61 having a planar-convex lens 62 secured adjacent one end thereof by means of a lens retaining ring 63 threaded into the lens casing 61. A quartz window 64 is secured outwardly of the lens 62 within the lens casing 61 by means of a window retaining ring 65 threaded into the end of the lens casing 61. A resilient O-ring 66 is mounted between the lens 62 and the lens casing 61 and a resilient O-ring 67 is mounted between the quartz window 64 and the casing 61 to provide for thermal compensation and to seal the end of the lens casing. An additional resilient O-ring 68 is provided in an external groove of the lens casing 61 for sealing the lens casing within the enclosure member 20 attached to the dipstick. The lens casing 61 can be adjustably mounted within the housing so that the focal point of the convex lens 62 will coincide with the internal bottom surface of the dipstick. The infrared radiation passing through the lens 62 is then collimated by a plurality of baffle washers 69 which are coaxially mounted within the lens casing 61 by means of arc rings 70. An infrared detector assembly 71 is secured to an adapter 72 by means of a plurality of screws 73, only one of which is shown in FIG. 4, and the adapter 72 is secured in the end of the lens casing 61 by means of a set screw 74. A sapphire or quartz rod 75 is coaxially mounted within the adapter 72 for conducting the infrared radiation from the lens 62 to the detector 76 mounted in the detector head 71. Suitable resilient O-rings 77 and 78 are provided to seal the adapter to the detector head assembly and the lens casing, respectively. The entire assembly may be grounded by a suitable ground wire 79 and the detector 76 may be connected externally of the housing to any suitable signal processing system by means of the wires 80.

In view of the high temperatures involved in the use of the immersion infrared thermometer the dipstick is adapted to be transferred between the preheating assembly and the molten material whose temperature is to be measured by means of a suitable robotic device. The thermometer is extremely durable and can be repeatedly used for accurately measuring the temperature of a molten material. Since the thermometer is in the form of a dipstick which may be immersed in the molten material it is possible to determine the temperature of the molten material at different distances from the surface.

While the invention has been particularly shown and described with reference to preferred embodiments thereof it will be understood by those in the art that the foregoing and other changes in form and details may be made therein without departing from the spirit and scope of the invention.

What is claimed is:

1. A temperatuare measuring system for molten materials comprising a hollow tubular dipstick having a closed end adapted to be inserted in the molten material with said dipstick being constructed of a material having a melting or deformation temperature higher than the estimated temperature of the molten material, infrared detecting means operatively connected to said dipstick for receiving infrared radiation from said end of said dipstick to provide an output signal indicative of the temperature of the molten material adjacent said end and infrared transmission means within said hollow dipstick for transmitting infrared radiation from an interior surface of said closed end to said infrared detector means, wherein said infrared transmitting means within said hollow dipstick include lens means mounted in said hollow dipstick in alignment with said closed end and having a focal point located on the inside surface of said closed end and an intermediate infrared transmitting rod disposed in alignment with said lens means for transmitting infrared radiation from said lens means to said infrared detector means.

2. A temperature measuring system for molten materials as set forth in claim 1 further comprising a hollow receptacle adapted to receive said hollow dipstick therein and heating means operatively associated with said receptacle for preheating said dipstick to a predetermined temperature close to, but less than, the estimated temperature of the molten material to prevent thermal shock upon immersion of the dipstick in the molten material.

3. A temperature measuring system as set forth in claim 1 wherein said infrared detector means is mounted on the end of said dipstick opposite said closed end.

4. A temperature measuring system as set forth in claim 1 wherein said infrared detector means is disposed at a location remote from said dipstick and further comprising flexible fiber optic means connected to the intermediate said rod and to said infrared detector means for transmitting infrared radiation to said detector means.

5. A temperature measuring system as set forth in claim 4 further comprising air passage means surrounding said fiber optic means for receiving cooling air.

6. A method for determining the temperature of molten materials at different depths comprising:
inserting the closed end of a hollow tubular dipstick, made from a material resistant to deformation or destruction at temperatures above the estimated temperature of the molten material, into the molten material to the desired depth wherein said dipstick is provided with lens means mounted therein in alignment with said closed end and having a focal point located on the inside surface of said closed end,
sensing the infrared radiation emanating from the internal surface of the closed end of the hollow tubular dipstick,
transmitting the sensed infrared radiation through said lens means and an infrared transmitting rod to infrared detector means, and
converting the sensed infrared radiation into an electrical signal indicative of the temperature of the molten material adjacent the closed end of the hollow tubular dipstick.

7. A method as set forth in claim 6 further comprising preheating the dipstick to a temperature close to but below the estimated temperature of the material prior to inserting the dipstick into the molten material.

* * * * *